United States Patent
Kaplan

(10) Patent No.: US 8,459,716 B2
(45) Date of Patent: Jun. 11, 2013

(54) REMOVABLE TAILGATE GAP COVER

(76) Inventor: David L. Kaplan, Utica, NY (US)

( * ) Notice: Subject to any disclaimer, the term of this patent is extended or adjusted under 35 U.S.C. 154(b) by 40 days.

(21) Appl. No.: 13/328,375

(22) Filed: Dec. 16, 2011

(65) Prior Publication Data
US 2012/0159857 A1    Jun. 28, 2012

Related U.S. Application Data

(60) Provisional application No. 61/425,865, filed on Dec. 22, 2010.

(51) Int. Cl.
*B62D 33/03* (2006.01)

(52) U.S. Cl.
USPC ............... 296/57.1; 296/50; 49/383; 52/459

(58) Field of Classification Search
USPC .......... 296/32, 33, 39.2, 50, 57.1, 61; 49/383; 16/250, 251; 52/459, 461, 468
See application file for complete search history.

(56) References Cited

U.S. PATENT DOCUMENTS

| | | | |
|---|---|---|---|
| 4,763,945 A | | 8/1988 | Murray |
| 4,969,674 A | * | 11/1990 | Wagner ........................ 293/128 |
| 5,516,185 A | * | 5/1996 | O'Donnell et al. .......... 296/166 |
| 5,664,822 A | | 9/1997 | Rosenfield |
| 2011/0080017 A1 | * | 4/2011 | Olson ......................... 296/57.1 |

* cited by examiner

*Primary Examiner* — Glenn Dayoan
*Assistant Examiner* — Jason S Daniels
(74) *Attorney, Agent, or Firm* — Tracy Jong Law Firm; Tracy P. Jong; Cheng Ning Jong

(57) ABSTRACT

A removable tailgate gap cover for preventing ingress of debris in a tailgate gap. The gap cover comprises an elongated cover plate having a top surface, a bottom surface, two longitudinal edges and an elongated support bar having an upper end and a lower end, wherein the upper end is fixedly attached to and substantially centrally aligned with the lengthwise direction of the bottom surface. The elongated support bar comprises a magnetic attaching means disposed along the lower end of the elongated support bar for attaching the gap cover to the floor of the end portion of the truck bed.

10 Claims, 8 Drawing Sheets

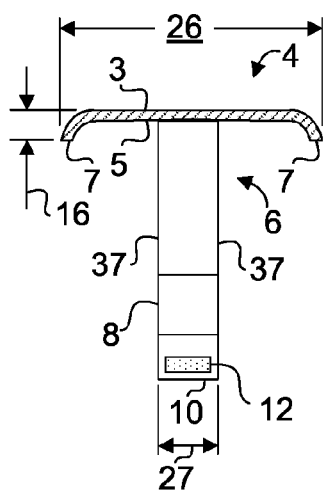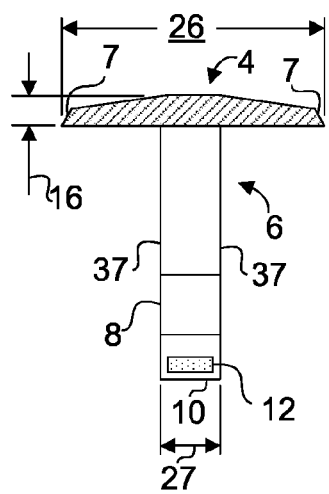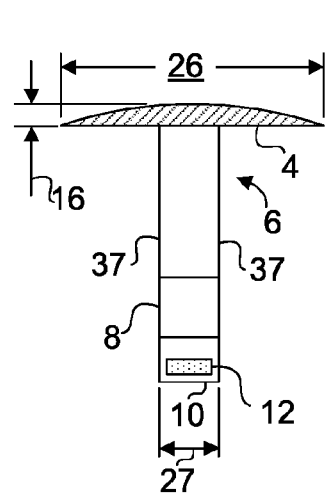
*FIG. 4*   *FIG. 4A*   *FIG. 4B*
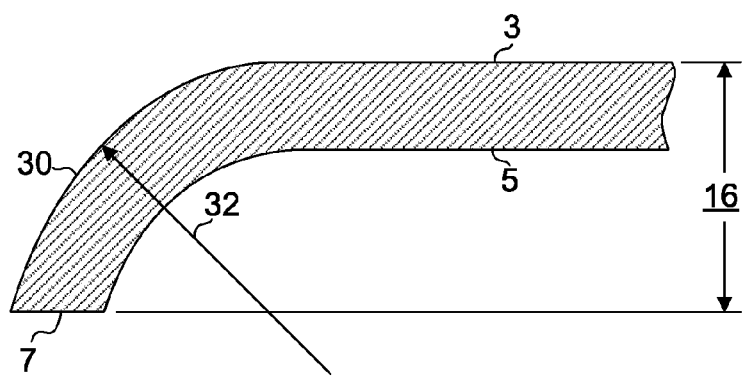
*FIG. 5*

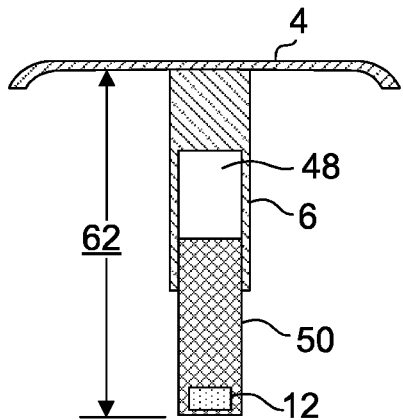
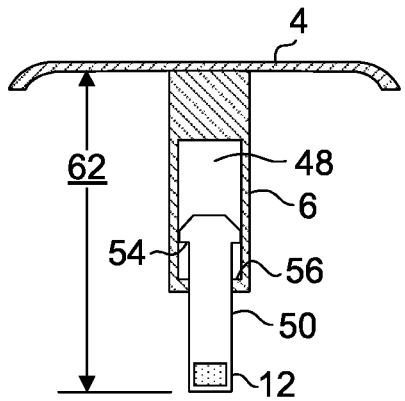
FIG. 12    FIG. 13
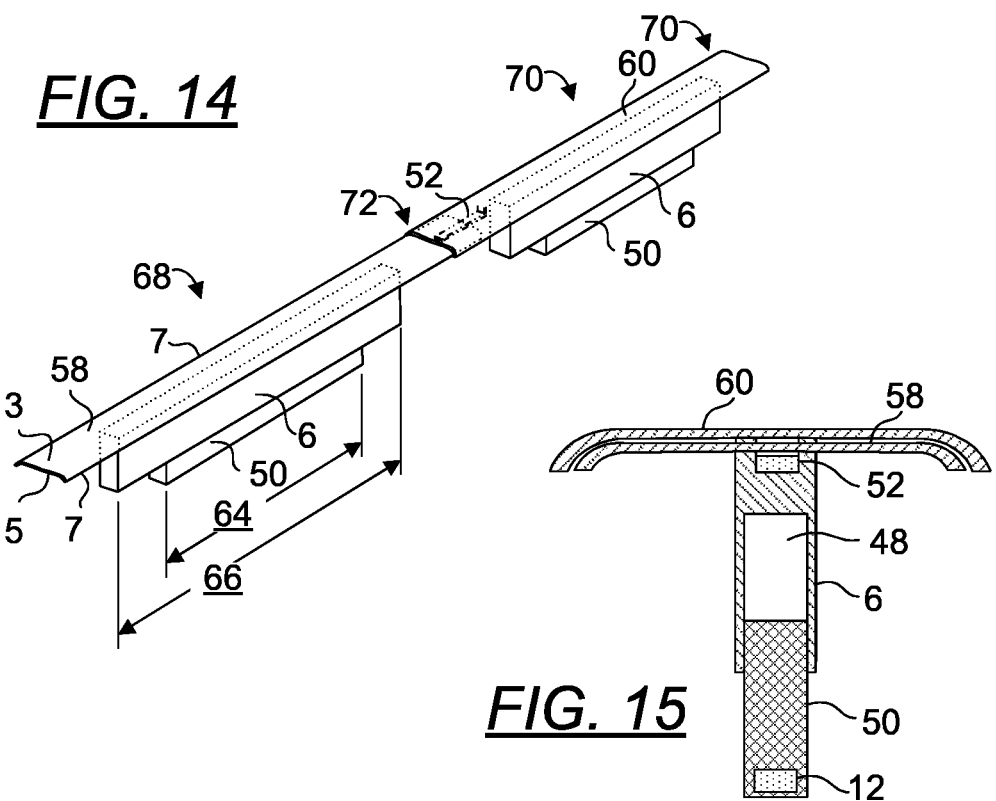
FIG. 14
FIG. 15

REMOVABLE TAILGATE GAP COVER

PRIORITY CLAIM AND RELATED APPLICATIONS

This non-provisional application claims the benefit of priority from provisional application U.S. Ser. No. 61/425,865 filed Dec. 22, 2010. Said application is incorporated by reference in its entirety.

BACKGROUND OF THE INVENTION

1. The Field of the Invention

The present invention is directed generally to a gap cover and more particularly, to a removable pickup truck gap cover adapted to bridge the gap created when a pickup truck tailgate is disposed in the horizontal, open position.

2. Background Art

Pickup trucks have been in use for many years. One primary function of a pickup is to transport materials from one location to another. Typically, discrete and large materials can be easily loaded and off-loaded onto/from a truck bed. A typical tailgate is configured to open to a horizontal position, that is, a position level with the truck bed. Most tailgates are designed to leave a gap between the tailgate and the truck bed for purposes of drainage or run-off from the truck bed. However, the gap that is designed for drainage and release of debris from the tailgate also allows aggregate materials, such as crushed rocks, sand, mulch, grain, debris and the like to enter the gap. This often plugs the gap and prevents proper closure of the tailgate.

Several solutions have been attempted to solve this problem. However, none of the prior art discloses a satisfactory solution where the original truck bed and its drainage design remain unmodified and intact. It is well known in the automobile industry that any modification performed to a vehicle typically depreciates its resale value. Additionally, it may cause other unintended consequences, such as deterioration in corrosion protection.

U.S. Pat. No. 5,664,822 to Rosenfield discloses a tailgate gap cover for attachment to pickup trucks to cover the gap formed between the tailgate and the truck bed. The tailgate gap cover includes a continuous structure having a truck bed panel, a tailgate panel and a folding panel that connects the truck bed panel and the tailgate panel. In use, the tailgate panel is secured to a tailgate and the truck bed panel is secured to a truck bed by common sheet metal fasteners and the folding panel is disposed over a gap to prevent ingress of debris. As such, Rosenfield's tailgate gap cover is not readily removable per use. Upon exposure to weather elements such as melting snow and road spray, this tailgate gap cover tends to retain moisture and debris within the truck bed in its closed position by not permitting easy drainage. Further, as the folding panel is configured to allow bending to accommodate opening and closing of a tailgate and is merely supported on its lengthwise periphery from the truck bed panel and the tailgate panel, heavy materials such as crushed rocks and sand tend to depress the folding panel when disposed over the same and presents a barrier to moving materials off the truck bed via the opened tailgate.

U.S. Pat. No. 4,763,945 to Murray discloses a tailgate track mat for preventing sand, dirt, gravel and other granular material from accumulating in the gap or track between the end of a truck bed and its tailgate, wherein the mat includes a resilient flexible strip of material extending over the track and transversely of the truck bed and tailgate. This disclosure employs magnets incorporated therein to allow the mat to slide in relation to the tailgate when the same pivots from the closed position to the open position. With this design, the mat does not automatically return to a predetermined position when the tailgate is then moved back to the closed position. This would likely cause it to become lodged in the tailgate gap thereby preventing the tailgate from closing. Additionally, if a truck having a truck mat, were loaded with material that covered the mat, the same would be further restricted from sliding back into position when the tailgate is moved from the open position to the closed position. This design further requires modification to the tailgate such that a portion of the mat can be fixedly secured by suitable screws to the tailgate.

It further is common practice to use a tarp as underlayment in materials transfer in order to protect the pickup truck bed from damage and to cover the tailgate gap. In such an instance, a tarp is positioned over the truck bed and the tailgate. The use of a tarp presents many challenges in that it is awkward to drape a tarp over the sidewalls of a truck bed and the tarp is easily torn or wrinkled with a shovel, a tool of choice, when working with aggregate materials disposed on the truck bed.

Thus, there exists a need for a gap cover that does not require modification to the tailgate and/or the truck bed and one that does not alter the drainage properties of the truck bed via the tailgate.

SUMMARY OF THE INVENTION

The present invention discloses a removable tailgate gap cover for preventing ingress of debris in a tailgate gap defined by a tailgate disposed in its open horizontal position, a vertical wall and a floor connected to the vertical wall of an end portion of a truck bed. The present invention comprises an elongated cover plate, an elongated support bar and an attaching means for attaching the removable tailgate gap cover to the floor of the end portion of the truck bed. The elongated cover plate includes a top surface, a bottom surface, two longitudinal edges and a height, wherein each longitudinal edge connects the top surface to the bottom surface. The elongated support bar includes an upper end, a lower end and at least a sidewall connecting the upper end to the lower end, wherein the upper end is fixedly attached to and substantially centrally aligned with the lengthwise direction of the cover plate. In one embodiment, the attaching means is disposed along the lower end of the elongated support bar. In another embodiment, the attaching means is disposed along the at least one sidewall of the elongated support bar.

It is a primary object of the present invention to provide a removable tailgate gap cover that prevents ingress of debris in a tailgate gap defined by an opened tailgate and an end portion of a truck bed so that damage to the tailgate and the end portion of the truck bed can be avoided and the tailgate can be properly closed.

It is another object of the present invention to provide a tailgate gap cover which does not require modifications to the tailgate and/or the truck bed for installation.

It is another object of the present invention to provide a substantially rigid bridge across the tailgate gap to facilitate the use of hand-trucks for loading and off-loading heavy materials.

It is another object of the present invention to provide a tailgate gap cover which does not alter the drainage properties of the end portion of the truck bed.

It is another object of the present invention to provide a tailgate gap cover which bridges the tailgate gap in order to provide a relatively smooth continuous path from the truck bed to an opened tailgate for trucks equipped with a camper, cap, tent and the like.

Whereas there may be many embodiments of the present invention, each embodiment may meet one or more of the foregoing recited objects in any combination. It is not intended that each embodiment will necessarily meet each objective.

Thus, having broadly outlined the more important features of the present invention in order that the detailed description thereof may be better understood, and that the present contribution to the art may be better appreciated, there are, of course, additional features of the present invention that will be described herein and will form a part of the subject matter of the claims appended to this specification.

In this respect, before explaining at least one embodiment of the invention in detail, it is to be understood that the invention is not limited in its application to the details of construction and the arrangements of the components set forth in the following description or illustrated in the drawings. The present invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent construction insofar as they do not depart from the spirit and scope of the conception regarded as the present invention.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 is a side cross-sectional orthogonal view of a tailgate gap cover of FIG. 1.

FIG. 4A is a side cross-sectional orthogonal view of a tailgate gap cover showing another embodiment of the cover plate.

FIG. 4B is a side cross-sectional orthogonal view of a tailgate gap cover showing yet another embodiment of the cover plate.

FIG. 5 is a partial side cross-sectional orthogonal view of the cover plate of FIG. 4 with an enlarged view of a curved edge.

FIG. 12 is a side cross-sectional orthogonal view of a tailgate gap cover.

FIG. 13 is a side cross-sectional orthogonal view of yet another embodiment of a tailgate gap cover.

FIG. 14 is a partially transparent top front perspective view of yet another embodiment of a tailgate gap cover depicting adjustability in height and length of the tailgate gap cover.

FIG. 15 is a side cross-sectional orthogonal view of the tailgate gap cover depicted in

FIG. 14.

PARTS LIST

2—tailgate gap cover
3—top surface of cover plate
4—cover plate
5—bottom surface of cover plate
6—support bar
7—longitudinal edge
8—extension bar
9—upper end of support bar
10—magnetic bar
11—lower end of support bar
12—magnet
14—length of cover plate
16—height of cover plate
17—truck
18, 19—height of support bar
20—area showing filled tailgate gap
22—area showing diminished gap of closed tailgate
24—length of support bar
25—notch
26—width of cover plate
27—width of support bar
30—cover plate curve
32—radius of cover plate curve
34—floor of end portion of truck bed
35—vertical wall of end portion of truck bed
36—truck bed
37—sidewall of support bar
38—tailgate
39—auxiliary wall of support bar
40—loose materials (debris)
42—hinge 44—tailgate gap
46—truck bed sidewall
48—slot
50—extension member
52—hook
54—protrusion
56—stop
58—inner cover plate
60—outer cover plate
62—combined height of extension member and support bar
64—length of extension member
66—length of support bar
68—inner piece of tailgate gap cover
70—outer piece of tailgate gap cover
72—longitudinal end of an outer piece

PARTICULAR ADVANTAGES OF THE INVENTION

The present gap cover provides a tailgate gap cover that is simple to use, install and remove. It requires no modification to the tailgate and/or truck bed for installation. The present invention further provides a tailgate gap cover that does not alter the drainage properties of a truck bed and one that has sufficient structural rigidity for supporting heavy materials without cave-in.

In one embodiment, the present gap cover is adjustable in height and in length, thereby making it versatile for use with tailgate gaps of various sizes and makes.

DETAILED DESCRIPTION OF A PREFERRED EMBODIMENT

Figure 1:
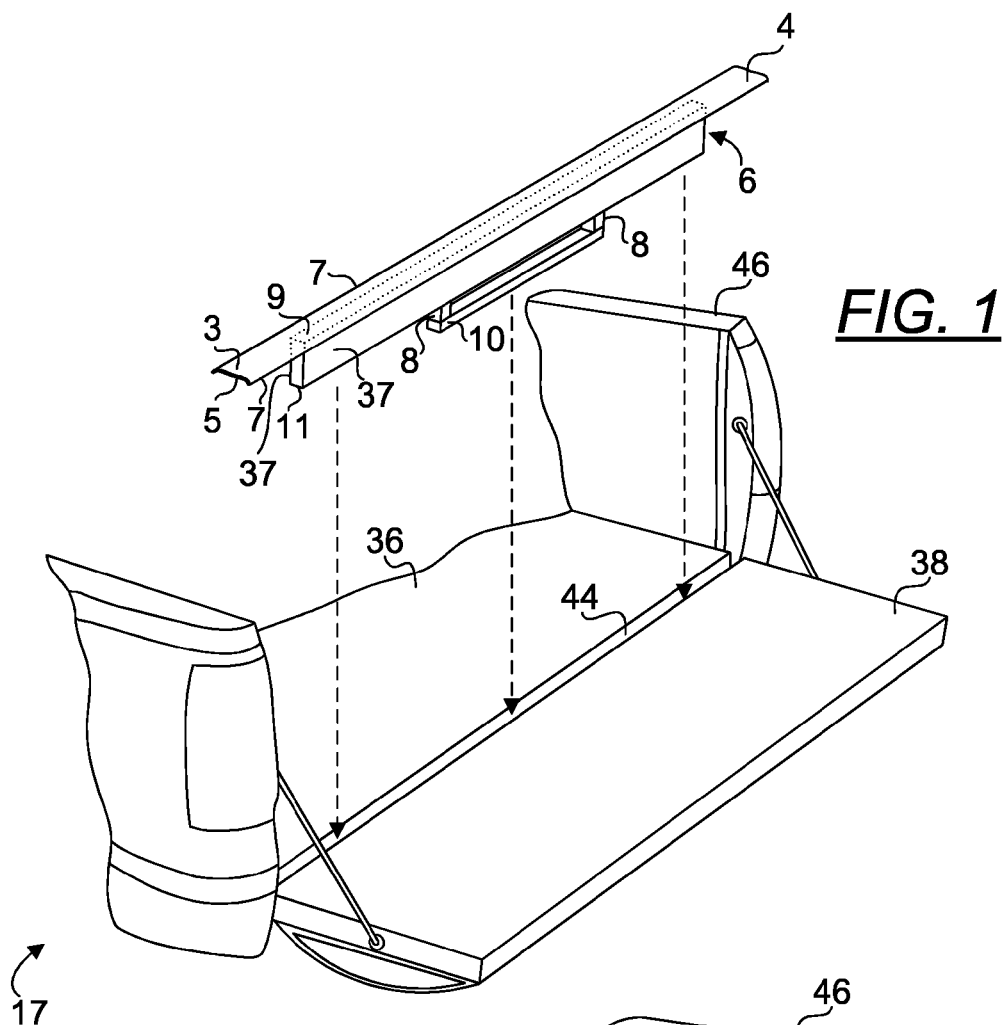
FIG. 1 is a partial top front perspective view of a tailgate gap cover according to the present invention being positioned to be installed to plug the tailgate gap of a truck.

FIG. 1 is a partial top front perspective view of a tailgate gap cover 2 according to the present invention as it is positioned for installation to plug the tailgate gap 44 of a truck 17. The tailgate gap cover 2 includes an elongated cover plate 4, an elongated support bar 6, a plurality of extension bars 8 and a magnetic bar 10. The elongated cover plate 4 includes a top surface 3, a bottom surface 5 and two longitudinal edges 7, and each longitudinal edge 7 connects the top surface 3 to the bottom surface 5. The elongated cover plate 4 of FIG. 1 is shown as partially transparent such that the upper end 9 of the elongated support bar 6 is visible. The elongated support bar 6 includes an upper end 9, a lower end 11 and two sidewalls 37, wherein the upper end 9 is fixedly attached to and substantially centrally aligned with the lengthwise direction of the bottom surface 5. The magnetic bar 10 includes an embedded and protected magnet 12 (see FIG. 3) disposed along substantially the entire length of the magnetic bar 10. In order to save materials used to create the necessary height from the top surface 3 to the bottom of the magnetic bar 10, two extension bars 8, each disposed at one end of the magnetic bar 10, are used to secure the magnetic bar 10 to the support bar 6. Suitable materials for the top surface 3 include Teflon, nylon and aluminum as such materials are durable against abrasions, lightweight and non-corrosive.

Figure 2:
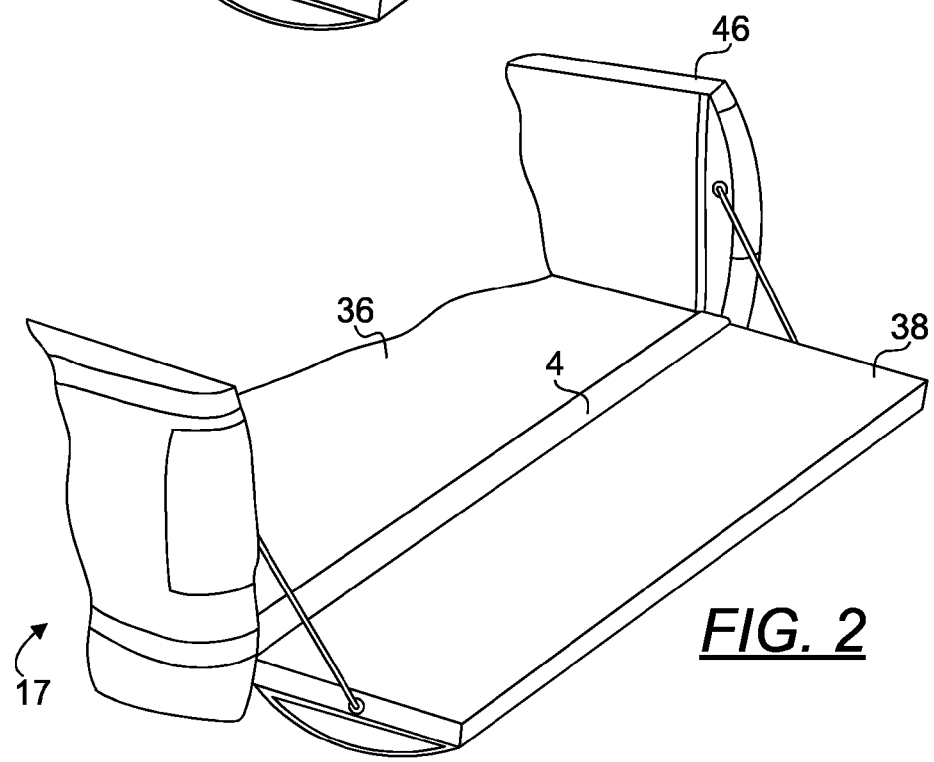
FIG. 2 is a partial top front perspective view of a tailgate gap cover upon installation to plug the tailgate gap of a truck.

FIG. 2 is a partial top front perspective view of a tailgate gap cover 2 according to the present invention as installed to plug the tailgate gap 44 of a truck. As shown, the top surface 3 of the cover plate 4 stays substantially flush with the tailgate 38 and the truck bed 36.

Figure 3:
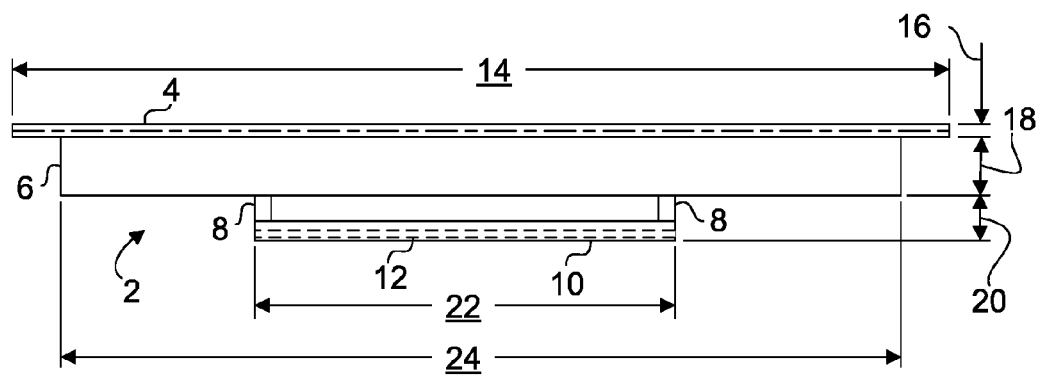
FIG. 3 is a front orthogonal view of a tailgate gap cover according to the present invention.

FIG. 3 is a front orthogonal view of a tailgate gap cover 2 according to the present invention. The elongated cover plate 4 has a height 16 and a length 14. In a preferred embodiment, the height 16 ranges from about ⅛ inch to about ⅝ inch and the length 14 is configured to suit the width of a truck bed on which the gap cover 2 is utilized. The elongated support bar 6 has a height 18 and a length 24. In a preferred embodiment, the length 24 of the elongated support bar 6 is configured shorter than the length 14 of the elongated cover plate 4 and thus does not extend the entire length of the elongated cover plate 4. Applicant found such difference in length 14, 24 to be critical for accommodating hinges or other mechanisms necessary on the truck bed or tailgate for pivoting the tailgate. The inset of the support bar 6 from the lengthwise ends of the cover plate 4 further provides handholds for facilitating removal of the tailgate gap cover 2 from its installed position.

The magnetic bar 10 is preferably even shorter in length than the elongated support bar 6. A magnet 12 is embedded within the magnetic bar 10 to avoid direct contact of the magnet 12 with a floor of an end portion of the truck bed. By way of example, pickup trucks such as the 2007 Ford Ranger and 2007 Mazda B4000 are among pickup trucks in the market which utilize a truck bed configuration having a floor at its end portion. It is to be understood that another means for attaching the gap cover 2 may be necessary or used if the floor (34 of FIG. 7) is constructed from a non-ferrous material. Although not desirable, a hook and loop combination may be used to secure the gap cover 2. In the case of a hook and loop combination, it is preferable to dispose the hook portion on the floor while the loop portion on the magnetic bar to ease cleaning of the attaching portion that is disposed on the floor.

Figure 3A:
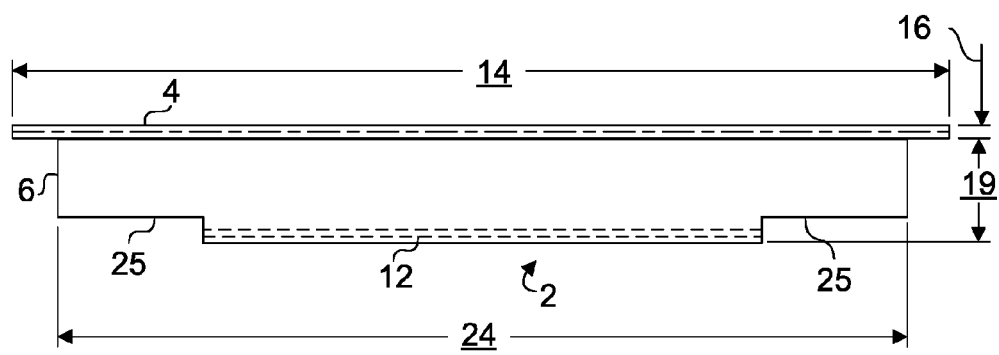
FIG. 3A is a front orthogonal view of an alternate embodiment of a tailgate gap cover.

FIG. 3A is a front orthogonal view of another embodiment of a tailgate gap cover according to the present invention. In this embodiment, the elongated support bar 6 is extended in height to replace the separate magnetic bar 10 and extension bars 8 as shown in FIG. 3. A magnet 12 is instead embedded at substantially the lower end of the support bar 6, spanning at least a portion of the length 24 of the support bar 6. In one embodiment, the magnet 12 is formed integrally with the support bar 6 and the cover plate 4 as a unit. Each of the longitudinal ends of the support bar 6 is preferably cut out to provide a notch 25 to accommodate a tailgate hinge.

FIG. 4 is a side cross-sectional orthogonal view of a tailgate gap cover of FIG. 1, depicting a cover plate 4 having a substantially flat top surface 3 terminating in two curved longitudinal edges 7 with curves 30. The width 26 of the cover plate 4 is configured to fully cover the top width of a tailgate gap while the width 27 of the support bar 6 is configured to fit snugly within the vertical opening of a tailgate gap. FIG. 4A is a side cross-sectional orthogonal view of a tailgate gap cover according to the present invention showing another embodiment of the cover plate 4. In this embodiment, the two longitudinal edges 7 are inclined inwardly toward one another. The top surface extends inwardly from the two longitudinal edges 7 to form a shallow trapezoid. Such a cover plate 4 profile provides little obstruction to materials movement while providing sufficient strength to support the materials. FIG. 4B is a side cross-sectional orthogonal view of a tailgate gap cover showing yet another embodiment of the cover plate. In this embodiment, the top surface of the cover plate 4 is a curved surface having a radius of from about 6 to about 12 inches and a height 16 of from about ⅛ to about ⅝ inch.

Figure 6:
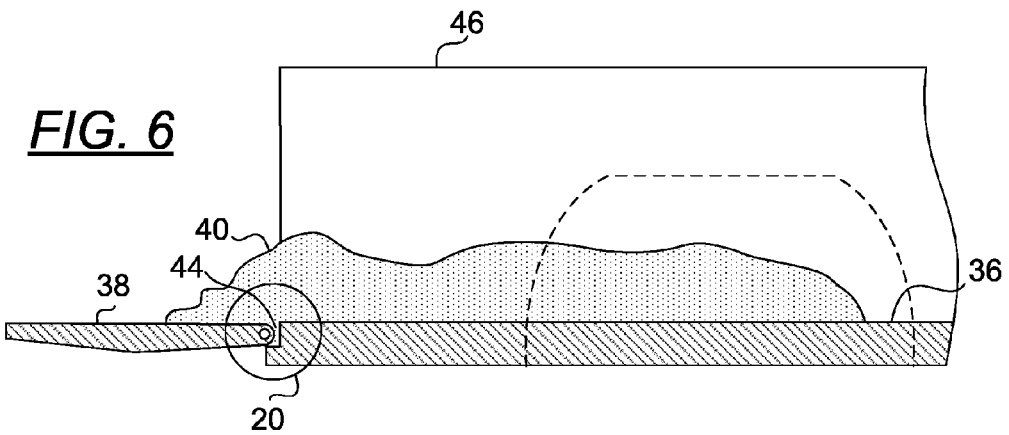
FIG. 6 is a partial side cross-sectional orthogonal view of a truck bed with an opened tailgate showing an uncovered tailgate gap filled with materials disposed on the truck bed and tailgate.

FIG. 5 is a partial side cross-sectional orthogonal view of the cover plate 4 of FIG. 4 showing a curved edge. In one preferred embodiment, the edge 7 comprises a curve having a radius 32 ranging from about 3 to about 9 inches. In use and installed, each curved edge 7 is pressed against an end portion of the truck bed 36 or the tailgate 38. FIG. 6 is a partial side cross-sectional orthogonal view of a truck bed 36 with an opened tailgate 38 showing an uncovered tailgate gap 44 filled with aggregate or loose materials 40 disposed on the truck bed 36 and tailgate 38. As shown, there is nothing to prevent the ingress of loose materials 40 in the tailgate gap in area 20.

Figure 7:
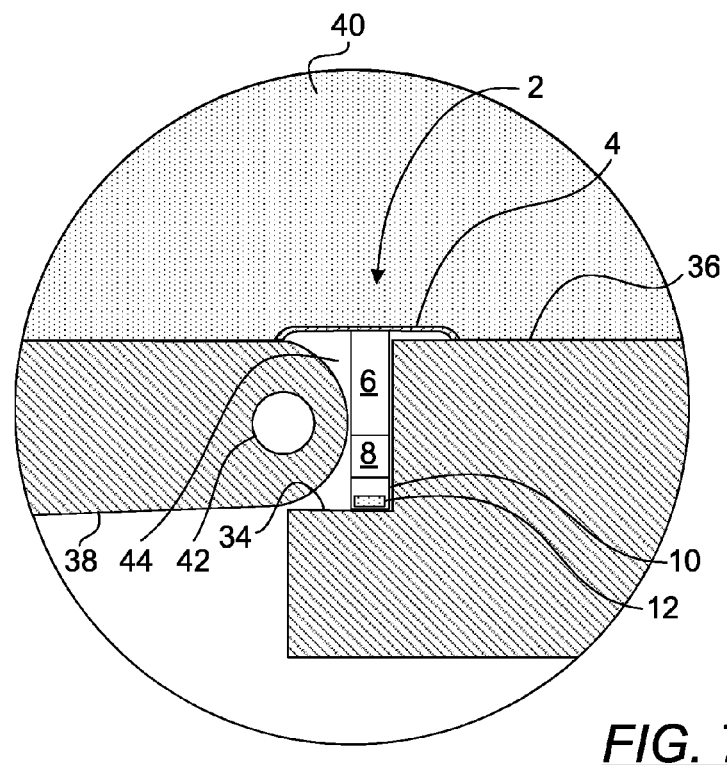
FIG. 7 is a closeup side cross-sectional orthogonal view of a tailgate gap cover mounted in a tailgate gap and showing the ability of the gap cover in preventing materials from entering the tailgate gap.

FIG. 7 is a closeup side cross-sectional orthogonal view of the tailgate gap cover mounted in a tailgate gap shown in area 20 of FIG. 6, showing the ability of the gap cover 2 in preventing materials 40 from entering the covered tailgate gap 44. The magnetic bar 10 is disposed in contacting and magnetic abutment with the floor 34 constructed of a ferrous metal. The magnet 12 is preferably protected from direct contact with the floor 34 to minimize potential damage due to impact and abrasion. In one embodiment, the magnet 12 is integrally formed with the magnetic bar 10 in an injection molding process where a magnet 12 is placed in a mold cavity which is then filled with polymeric resin prior to curing of the magnetic bar 10. The extension bars 8 are preferably collars. The magnetic bar 10 preferably has a countersunk perforation on its bottom surface on each lengthwise end such that a suitable screw may be positioned through the countersunk hole and the collar to secure both the magnetic bar 10 and extension bars 8 to the support bar 6. Upon conclusion of using a the gap cover 2, the area in the vicinity of the tailgate gap 44 is cleaned to be free of debris before the tailgate gap cover 2 is removed by applying a pulling force on a longitudinal end of the cover plate 4.

Figure 8:
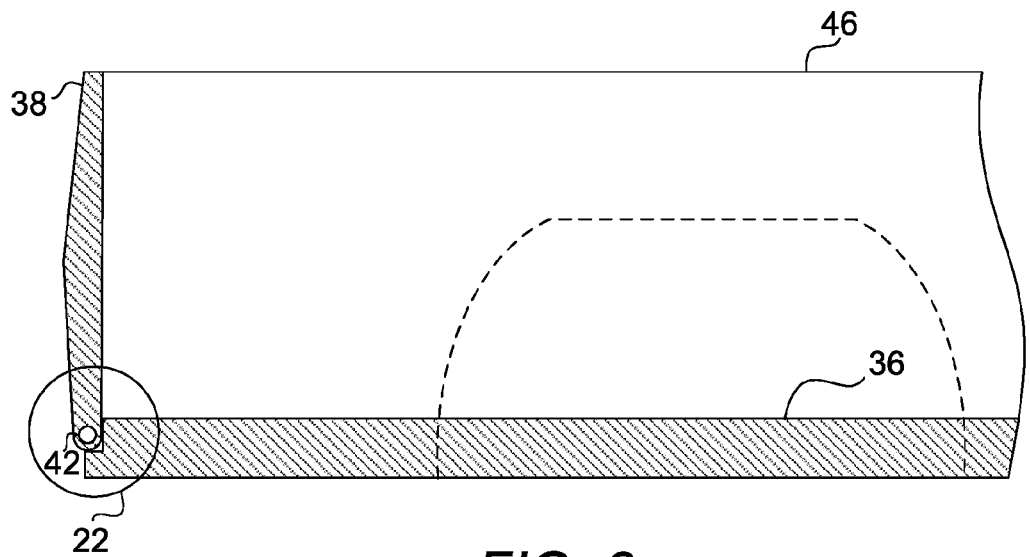
FIG. 8 is a partial side cross-sectional orthogonal view of a truck bed with a closed tailgate showing diminished gap between the tailgate and the truck bed.

FIG. 8 is a partial side cross-sectional orthogonal view of a truck bed 36 with a closed tailgate 38 showing diminished gap between the tailgate and the truck bed 36 as a result of rotating the tailgate 38 of FIGS. 6 and 7 about hinge 42 towards the truck bed sidewall 46.

Figure 9:
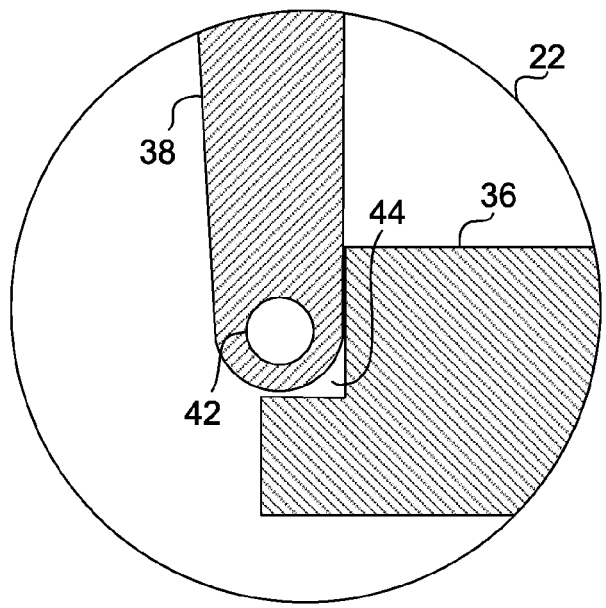
FIG. 9 is a closeup of side cross-sectional orthogonal view of the closed tailgate of portion 22 of FIG. 8.

FIG. 9 is a closeup side cross-sectional orthogonal view of the closed tailgate of FIG. 8. As such, it is important that the tailgate gap be cleared of debris that may prevent the proper closure of the tailgate 38. Abrasion damage to the end portion of the truck bed 36 and the tailgate 38 due to an attempt to close a debris 40 filled tailgate 38 can also be avoided.

Figure 10:
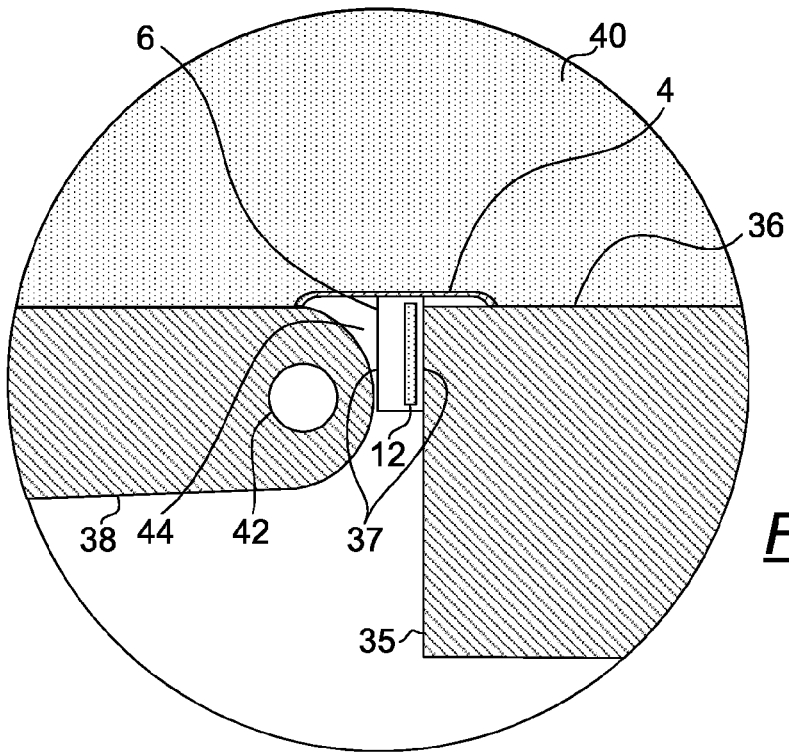
FIG. 10 is a partial side cross-sectional orthogonal view of a truck bed without a tailgate gap floor showing the use of one embodiment of the present tailgate gap cover adapted to such a tailgate configuration.

FIG. 10 is a partial side cross-sectional orthogonal view of a truck bed 36 without a tailgate gap floor 34 depicting the use of one embodiment of the present tailgate gap cover adapted to such a tailgate configuration. In some custom or low volume truck beds, the floor 34 shown in FIG. 7 is omitted for cost savings and ease of construction. In this instance, one embodiment of the present invention is configured to be removably attached to a vertical wall 35 of the end portion of the truck bed 36. A magnet 12 is instead disposed on a sidewall 37 of the support bar 6. The magnet 12 is again protected from direct contact with the vertical wall 35 of the end portion of the truck bed 36. In a preferred embodiment, the magnet 12 is integrally formed with the support bar 6.

Figure 11:
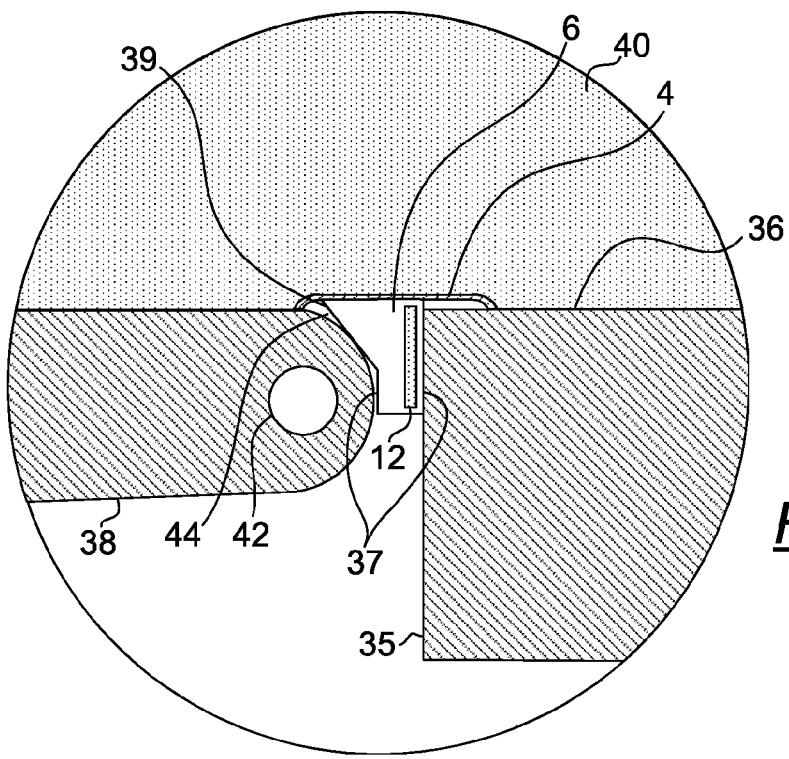
FIG. 11 is a partial side cross-sectional orthogonal view of a truck bed without a tailgate gap floor showing the use of yet another embodiment of the present tailgate gap cover adapted to such a tailgate configuration.

FIG. 11 is a partial side cross-sectional orthogonal view of a truck bed 36 without a tailgate gap floor 34 depicting the use of yet another embodiment of the present tailgate gap cover adapted to such tailgate configuration. In this embodiment, the support bar 6 of FIG. 10 is configured to include an auxiliary wall 39 extending at an incline from a sidewall 37 of the support bar 6. The incline of the auxiliary wall 39 is configured such that when installed, the support bar 6 substantially snugly plugs the tailgate gap 44.

FIG. 12 is a side cross-sectional orthogonal view of a tailgate gap cover. In this embodiment, an extension member 50 is configured to be vertically and snugly slideable within a slot 48 disposed in the support bar 6 such that the combined height 62 of the support bar 6 and the extension member 50 is adjustable for truck bed-tailgate configuration of various types of trucks.

FIG. 13 is a side cross-sectional orthogonal view of yet another embodiment of a tailgate gap cover according to the present invention. In this embodiment, an extension member 50 is configured to be vertically and snugly slideable within a slot 48 disposed in the support bar 6 such that the combined height 62 of the support bar 6 and the extension member 50 is adjustable for truck bed-tailgate configuration of various types of trucks. In addition, the extension member 50 is configured to be retained by the slot 48. The extension member 50 is configured to include protrusions 54 which prevent the extension member 50 from completely detaching from the slot 48 by having stops 56.

Figure 16:
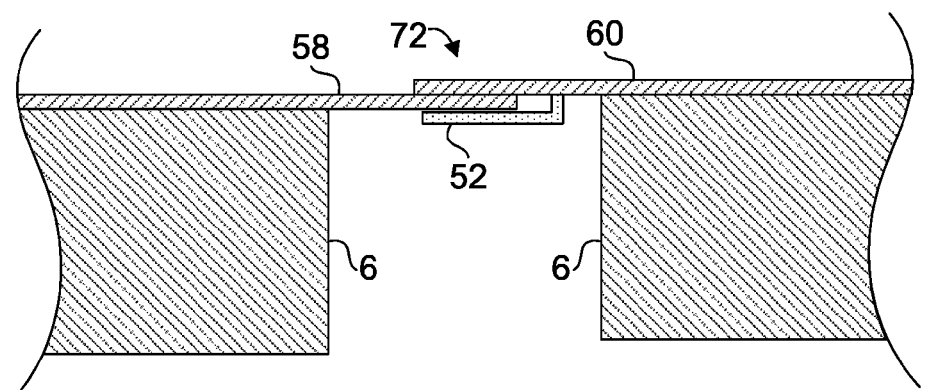
FIG. 16 is a partial front cross-sectional orthogonal view of the tailgate gap cover depicted in FIG. 14.

FIG. 14 is a partially transparent top front perspective view of yet another embodiment of a tailgate gap cover depicting adjustability in height and length of the tailgate gap cover. FIG. 15 is a side cross-sectional orthogonal view of the tailgate gap cover depicted in FIG. 14. FIG. 16 is a partial front cross-sectional orthogonal view of the tailgate gap cover depicted in FIG. 14. In this embodiment, the tailgate gap cover is provided in essentially two parts, i.e., the inner piece 68 and the outer piece 70. Each piece 68, 70 is substantially similar to the embodiment disclosed in FIG. 12. However, the cover plate 60 of the outer piece 70 is configured sufficiently large so as to cover the cover plate 58 of the inner piece 68 in its entirety in the widthwise direction of the cover plates 58, 60. In use, the cover plate 58 is slidingly disposed under the cover plate 60 such that the length of the tailgate gap cover is adjustable. The length 64 of the extension member 50 is preferably configured shorter than the length 66 of the support bar 6 in order to accommodate hinges or other mechanisms necessary on the truck bed 36 or tailgate 38 for pivoting the tailgate 38. The height of the support bar 6 is also preferably configured to clear such mechanisms. In one embodiment, a hook 52 is further provided and disposed on a longitudinal end 72 of the outer piece 70 to secure the cover plate 58 of the inner piece 68. As shown in FIG. 14, the hook 52 is disposed with its opening facing a longitudinal end 72 of the cover plate 58 such that a portion of the cover plate 58 can be slid into the opening to be secured.

In yet another embodiment (not shown), the tailgate gap cover is provided in three parts, wherein one outer piece 70 is slideably connected at each longitudinal end 72 to an inner piece 68. A hook is provided on each longitudinal end of the cover plate 60 for removably and slidingly securing a portion of a cover plate 58.

It will be appreciated by those skilled in the art that while the invention has been described above in connection with particular embodiments the invention is not necessarily so limited and that numerous other embodiments, uses, modifications and departures from the embodiments, and uses may be made without departing from the inventive concepts.

I claim:

1. A removable tailgate gap cover for preventing ingress of debris in a tailgate gap defined by a tailgate disposed in its open position, a vertical wall and a floor connected to said vertical wall of an end portion of a truck bed, said gap cover comprising:
    (a) an elongated cover plate having a length, a top surface, a bottom surface, two longitudinal edges and a height, wherein each said longitudinal edge connects said top surface to said bottom surface;
    (b) an elongated support bar comprising a length, a height, an upper end, a lower end, at least one sidewall connecting said upper end to said lower end, a-slot disposed at said lower end of said elongated support bar and an extension member comprising a lower end, said extension member is configured to slide within said slot in the direction delineated by said lower and upper ends of said elongated support bar, wherein said upper end is fixedly attached to and substantially centrally aligned with a lengthwise direction of said cover plate, and a combined height of said elongated support bar and said extension member is adjustable; and (c) a magnetic bar disposed along said lower end of said extension member for attaching said removable tailgate gap cover to said end portion of said truck bed, wherein said magnetic bar is disposed within said extension member.

2. The removable tailgate gap cover of claim 1, wherein said top surface is substantially flat and each of said two longitudinal edges comprises a radius of from about 3 to about 9 inches and said height of said cover plate of from about ⅛ to about ⅝ inches.

3. The removable tailgate gap cover of claim 1, wherein said top surface is a curved surface having a radius of from about 6 to about 12 inches and said height of said cover plate is from about ⅛ to about ⅝ inch.

4. The removable tailgate gap cover of claim 1, wherein said elongated support bar further comprises at least one stop disposed at said lower end of said elongated support bar such that complete detachment of said extension member from said elongated support bar in the direction delineated by said lower and upper ends of said elongated support bar is prevented.

5. The removable tailgate gap cover of claim 1, wherein said length of said elongated support bar is less than said length of said elongated cover plate.

6. The removable tailgate gap cover of claim 1, wherein said cover plate further comprises a hook disposed on a longitudinal end on said bottom surface of said cover plate, said hook comprises an opening facing a longitudinal end of a cover plate of a second removable tailgate gap cover.

7. A removable tailgate gap cover for preventing ingress of debris in a tailgate gap defined by a tailgate disposed in its open position, a vertical wall and a floor connected to said vertical wall of an end portion of a truck bed, said gap cover comprising:

(a) an elongated cover plate having a length, a top surface, a bottom surface, two longitudinal edges and a height, wherein each said longitudinal edge connects said top surface to said bottom surface, said top surface is substantially flat and each of said two longitudinal edges comprises a radius of from about 3 to about 9 inches and said height of said cover plate is from about ⅛ to about ⅝ inches;

(b) an elongated support bar comprising a length, a height, an upper end, a lower end, at least one sidewall connecting said upper end to said lower end, a slot disposed at said lower end of said elongated support bar and an extension member comprising a lower end, said extension member is configured to slide within said slot in the direction delineated by said lower and upper ends of said elongated support bar, wherein said upper end is fixedly attached to and substantially centrally aligned with a lengthwise direction of said cover plate, and a combined height of said elongated support bar and said extension member is adjustable; and (c) a magnetic bar disposed along said lower end of said extension member for attaching said removable tailgate gap cover to said end portion of said truck bed, wherein said magnetic bar is disposed within said extension member.

8. The removable tailgate gap cover of claim 7, wherein said elongated support bar further comprises at least one stop disposed at said lower end of said elongated support bar such that complete detachment of said extension member from said elongated support bar in the direction delineated by said lower and upper ends of said elongated support bar is prevented.

9. The removable tailgate gap cover of claim 7, wherein said length of said elongated support bar is less than said length of said elongated cover plate.

10. The removable tailgate gap cover of claim 7, wherein said cover plate further comprises a hook disposed on a longitudinal end on said bottom surface of said cover plate, wherein said hook comprises an opening facing a longitudinal end of a cover plate of a second removable tailgate gap cover.

* * * * *